(12) United States Patent
Li (10) Patent No.: US 11,640,441 B2
(45) Date of Patent: May 2, 2023

(54) PAGE DISPLAYING METHOD AND DEVICE, COMPUTER-READABLE STORAGE MEDIUM AND ELECTRONIC DEVICE

(71) Applicant: BOE Technology Group Co., Ltd., Beijing (CN)

(72) Inventor: Cunqing Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 70 days.

(21) Appl. No.: 17/490,867

(22) Filed: Sep. 30, 2021

(65) Prior Publication Data

US 2022/0237254 A1    Jul. 28, 2022

(30) Foreign Application Priority Data

Jan. 22, 2021    (CN) .......................... 202110091323.6

(51) Int. Cl.
| | |
|---|---|
| *G06F 9/44* | (2018.01) |
| *G06F 16/958* | (2019.01) |
| *G06F 16/957* | (2019.01) |
| *G06F 40/106* | (2020.01) |
| *G06F 8/65* | (2018.01) |

(52) U.S. Cl.
CPC .............. *G06F 16/972* (2019.01); *G06F 8/65* (2013.01); *G06F 16/9574* (2019.01); *G06F 16/9577* (2019.01); *G06F 16/986* (2019.01); *G06F 40/106* (2020.01)

(58) Field of Classification Search
CPC .. G06F 16/972; G06F 16/9574; G06F 16/986; G06F 16/9577; G06F 40/106; G06F 8/65
See application file for complete search history.

(56) References Cited

U.S. PATENT DOCUMENTS 11,537,400 B1 *  12/2022  Zhang ................... G06F 9/3005
2022/0058063 A1 *  2/2022  Moscatiello ............... G06F 8/52

\* cited by examiner

*Primary Examiner* — Chuck O Kendall
(74) *Attorney, Agent, or Firm* — IPro, PLLC (57) ABSTRACT

The present disclosure provides a page displaying method and device, a computer-readable storage medium, and an electronic device. The method comprises: acquiring, in response to a display instruction to a target page in a Flutter application program, a component file of the target page from a server, wherein the component file comprises at least: component building information, a data interface address, and a binding relation between component data and a page object; acquiring the component data of the target page according to the data interface address, and building a component object of the target page according to the component building information; merging the component data into a corresponding component object according to the binding relation to build the target page; and displaying the target page.

20 Claims, 7 Drawing Sheets

PAGE DISPLAYING METHOD AND DEVICE, COMPUTER-READABLE STORAGE MEDIUM AND ELECTRONIC DEVICE

The application claims priority to Chinese Patent Application No. 202110091323.6, titled "PAGE DISPLAYING METHOD AND DEVICE, COMPUTER-READABLE STORAGE MEDIUM AND ELECTRONIC DEVICE" and filed to the State Patent Intellectual Property Office on Jan. 22, 2021, the contents of which are incorporated herein by reference in its entirety.

TECHNICAL FIELD

The present disclosure belongs to the technical field of computers, and in particular relates to a page displaying method and device, a computer-readable storage medium, and an electronic device.

BACKGROUND

Flutter is a cross-platform framework for mobile application development. Flutter using Dart programming language is applicable to operation systems such as Android, iOS and Web. Since Dart uses both AOT (Ahead-of-Time Compilation) and JIT (Just in Time Compilation), Flutter inherently supports dynamic processing. However, for the sake of security, Flutter framework does not allow Flutter to enable the dynamic function in a generating environment.

Therefore, in the related art, when a page of an application program needs to be updated, a developer needs to develop and issue a new application program version, and a mobile terminal downloads the new application program version and updates, so a new page style and display contents are displayed at a client.

SUMMARY

The present disclosure provides a page displaying method and device, a computer-readable storage medium and an electronic device.

According to a first aspect of the present disclosure, a page displaying method is provided, which may comprise:

acquiring, in response to a display instruction to a target page in a Flutter application program, a component file of the target page from a server, wherein the component file comprises at least: component building information, a data interface address, and a binding relation between component data and a page object;

acquiring the component data of the target page according to the data interface address, and building a component object of the target page according to the component building information;

merging the component data into a corresponding component object according to the binding relation to build the target page; and displaying the target page.

Optionally, after the step of displaying the target page, the method further comprises:

replacing, in response to an update instruction to the target page, a replacement character in the data interface address according to a page update strategy corresponding to the target page, to obtain a replaced data interface address;

acquiring update data according to the replaced data interface address;

re-performing a building process of the target page according to the update data, to obtain an updated target page; and displaying the updated target page.

Optionally, the update instruction comprises at least a target operation type, and the page update strategy comprises a corresponding relation between an operation type and an address character;

the step of replacing a replacement character in the data interface address according to a page update strategy corresponding to the target page comprises:

acquiring, according to the page update strategy, a target address character corresponding to the target operation type; and replacing the replacement character in the data interface address with the target address character.

Optionally, the step of re-performing a building process of the target page according to the updated data, to obtain an updated target page comprises:

merging the update data with the component data to obtain merged data; and re-performing the building process of the target page according to the merged data, to obtain the updated target page.

Optionally, after the step of displaying the updated target page, the method further comprises storing the target page before updating into a local cache;

when receiving, in a preset time period, a switching instruction to the target page before updating, acquiring the target page before updating from the local cache and displaying the target page before updating; or when not receiving, in the preset time period, the switching instruction to the target page before updating, deleting the target page before updating that is stored in the local cache.

Optionally, the step of acquiring a component file of the target page from a server comprises:

acquiring a component file of an AST data structure from the server, wherein the component file is obtained by using a language analyzer to convert a DART component file into a JSON component file; and parsing the component file according to a parsing rule of the AST data structure, and acquiring the component building information, the data interface address, and the binding relation between the component data and the page object of the target page.

Optionally, when the target page is a list page, the page object comprises list items;

the step of merging the component data into a corresponding component object according to the binding relation to build the target page comprises:

adding the component data into a corresponding list item according to the binding relation to build a list page.

According to a second aspect of the present disclosure, a page displaying device is provided, which may comprise:

an acquisition module, configured to acquire, in response to a display instruction to a target page in a Flutter application program, a component file of the target page from a server, wherein the component file comprises at least: component building information, a data interface address, and a binding relation between component data and a page object;

a preparation module, configured to acquire the component data of the target page according to the data interface address, and build a component object of the target page according to the component building information;

a building module, configured to merge the component data into a corresponding component object according to the binding relation to build the target page; and a display module, configured to display the target page.

According to a third aspect, the embodiments of the present disclosure provide a computer-readable storage medium, having a computer program stored therein, wherein when the computer program is executed by a processor, the steps of the page displaying method according to the first aspect are implemented.

According to a fourth aspect, the embodiments of the present disclosure provide an electronic device, comprising a processor, a memory and a computer program which is stored in the memory and may be run in the processor, wherein the computer program is executed by the processor, the steps of the page displaying method according to the first aspect are implemented.

The above description is merely a summary of the technical solutions of the present disclosure. In order to more clearly know the elements of the present disclosure to enable the implementation according to the contents of the description, and in order to make the above and other purposes, features and advantages of the present disclosure more apparent and understandable, the particular embodiments of the present application are provided below.

BRIEF DESCRIPTION OF THE DRAWINGS

By reading the detailed description of the preferred embodiments hereinafter, various other advantages and benefits are clearer to a person of ordinary skill in the art. The accompanying drawings merely illustrate the preferred embodiments, and shall not be construed as limiting the present disclosure. In all the drawings, identical reference symbols represent identical parts. Among the drawings.

DETAILED DESCRIPTION

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, those embodiments are provided to help those skilled in the art more thoroughly understand the present disclosure and entirely convey the scope of the present disclosure to those skilled in the art.

The page displaying method according to the embodiments of the present disclosure will be described in detail below.

Figure 1:
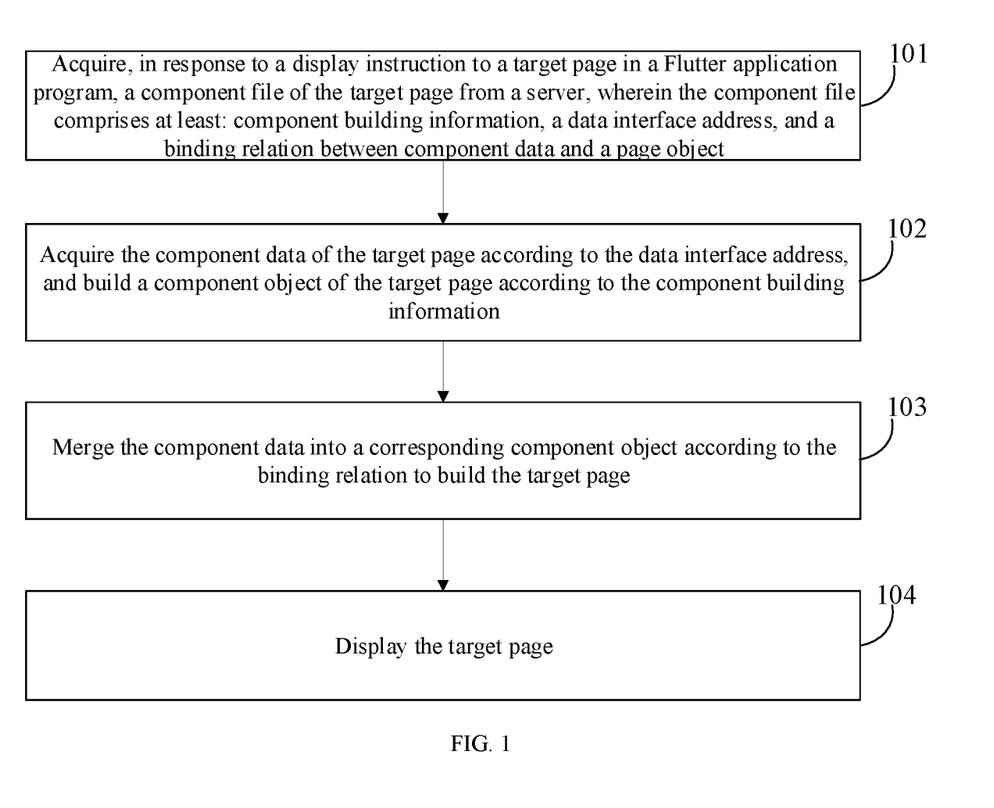
FIG. 1 illustrates a flowchart of a page displaying method according to the embodiments of the present disclosure.

FIG. 1 illustrates a flowchart of a page displaying method according to the embodiments of the present disclosure. As shown in FIG. 1, the method may comprise:

Step 101, in response to a display instruction to a target page in a Flutter application program, a component file of the target page is acquired from a server, wherein the component file comprises at least: component building information, a data interface address, and a binding relation between component data and a page object.

According to the embodiments of the present disclosure, Flutter is a cross-platform framework for mobile application development. Flutter using Dart programming language is applicable to operation systems such as Android, iOS and Web. However, for the sake of security, Flutter itself does not provide a dynamic page generation function. Aiming at such shortcoming, the embodiments of the present disclosure realize dynamic generation of pages in an application program developed with Flutter. The display instruction may be an instruction generated in a process that a user triggers, through input to a Flutter application program, displaying of the target page. The display instruction may also be an instruction generated in a process that, when a Flutter application program runs, the application program itself or a system automatically triggers displaying of the target page. The component building information refers to all information required to build a hierarchical tree of a component, for example, component style elements, a display position, display conditions, etc. Here, the component refers to a page component of the page. The data interface address refers to an address which provides a data interface of the component data. By accessing the data interface address, the data interface is invoked to acquire the component data. The binding relation between the component data and the page object may be constituted by a URL (uniform resource locator) and JsonPath (a variable used to parse JSON data). The URL is the data interface address, while JsonPath is used to describe a path that the page object queries required data in the component data, thereby realizing the binding relation between the component data and the page object.

In actual application, if a client of a Flutter application program receives a display instruction to a target page, the Flutter application will automatically transmit an acquisition request for a component file to a server, and the server will transmit, after verifying an identity of the client, the component file of the target page to the client of the Flutter application program in response to the acquisition request, so the client continuously performs the displaying process of the target page.

Step 102, the component data of the target page is acquired according to the data interface address, and a component object of the target page is built according to the component building information.

According to the embodiments of the present disclosure, the client of the application program invokes, by accessing the data interface address, a data interface related to the target page from the server, such that the server generates the component data and provides the component data to the client, thus realizing dynamic acquisition of the component data by the client of the application program. The client of the application program builds, on the basis of the component building information, the hierarchical tree of the component object in the target page, thereby generating the component object in the target page. The component object may be a widget in the target page, used to conduct page style functions such as clock, list and suspension box. The building process of the component object may be executed with reference to the conventional component building method in the related art, and is not repeated here. The embodiments of the present disclosure are mainly featured by acquisition of the component building information from the server during page display, realizing dynamic acquisition of the component building information.

Step 103, the component data is merged into a corresponding component object according to the binding relation to build the target page.

According to the embodiments of the present disclosure, a component object corresponding to each component data may be queried according to the binding relation in the component file, and the target page is dynamically generated by mapping the component data into the component object, so the page contents are dynamically arranged. Therefore, when pages in the Flutter application program need to be updated, it does not need to issue a new application program version to update the component file in the page, and the target page displayed in English may be the dynamically generated according to the component file acquired in real time.

Step 104, the target page is displayed.

According to the embodiments of the present disclosure, after building the target page is completed, the client of the Flutter application program dynamically updates the contents of the target page by displaying a tendered target page in a display screen of a device with the client.

When the Flutter application program needs to display the target page, the page displaying method according to the embodiments of the present disclosure realizes dynamic acquisition of a page layout by acquiring the page file for building the target page from the server to build the target page, and realizes dynamic acquisition of the page contents through the binding relation between the component object and component data in the page, so that the page displayed by the Flutter application program may be updated more efficiently.

Figure 2:
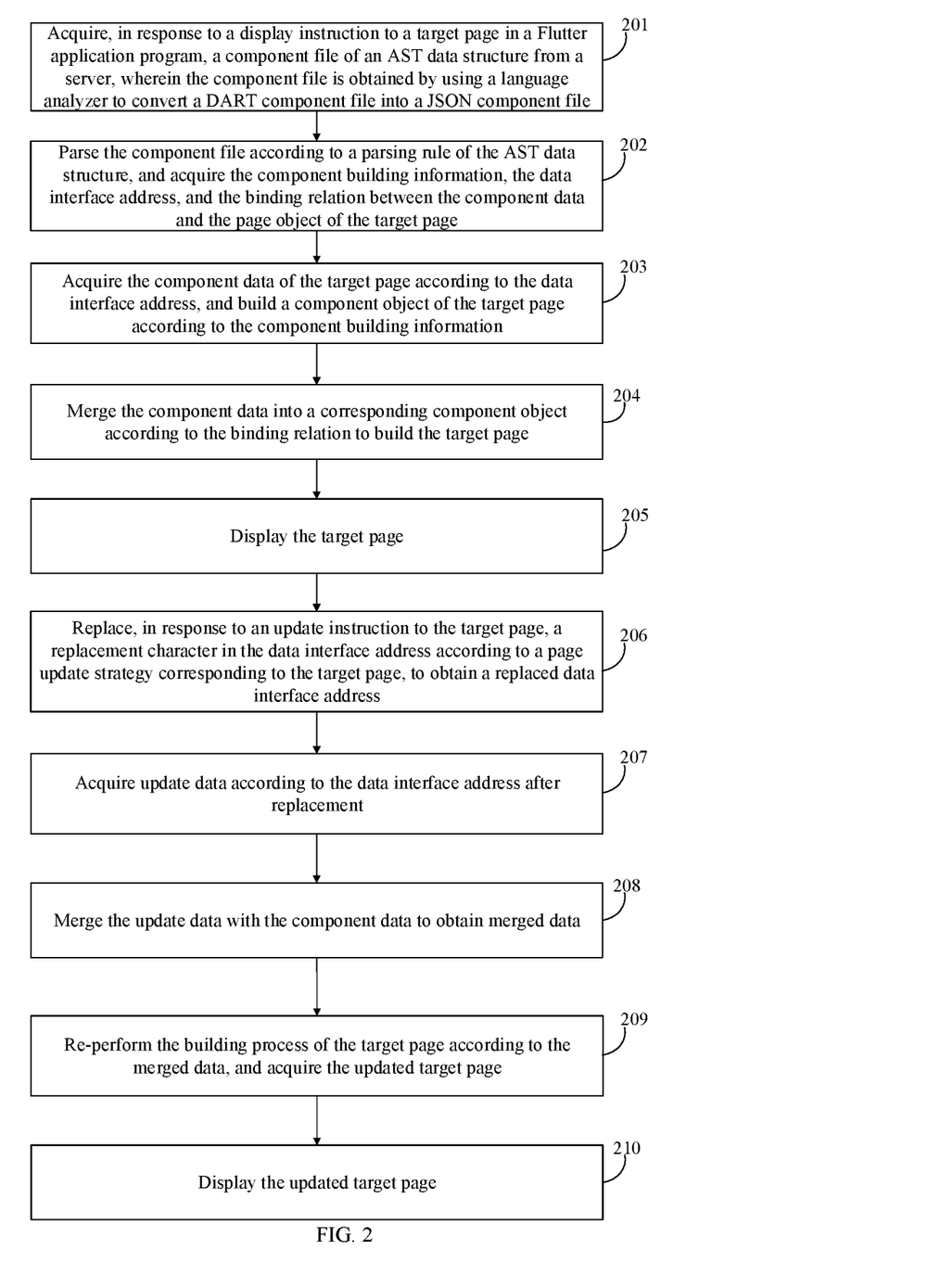
FIG. 2 illustrates a flowchart of another page displaying method according to the embodiments of the present disclosure.

FIG. 2 illustrates a flowchart of another page displaying method according to the embodiments of the present disclosure. As shown in FIG. 2, the method may comprise:

Step 201, in response to a display instruction to a target page in a Flutter application program, a component file of an AST data structure is acquired from a server, wherein the component file is obtained by using a language analyzer to convert a DART component file into a JSON component file.

According to the embodiments of the present disclosure, a developer of the Flutter application program may design and develop the component file of the target page based on DART language first, then convert the component file from a DART language into an AST data structure using a language analyzer (analyzer tool) provided by the DART language, store the component file in JSON format and upload the component file in JSON format to the server for storage, such that the Flutter application program requests and acquires the component file when displaying the target page.

Step 202, the component file is parsed according to a parsing rule of the AST data structure, and the component building information, the data interface address, and the binding relation between the component data and the page object of the target page are acquired.

According to the embodiments of the present disclosure, a client of the Flutter application program is configured with a parser for the AST (Abstract Syntax Tree) data structure. The parser may parse the component file according to the AST parsing rule to obtain the component building information, the data interface address, and the binding relation between the component data and the page object that the client may use.

Step 203, the component data of the target page is acquired according to the data interface address, and a component object of the target page is built according to the component building information.

This step may be understood with reference to the detailed description of step 102, and is not repeated here.

Step 204, the component data is merged into a corresponding component object according to the binding relation to build the target page.

This step may be understood with reference to the detailed description of step 103, and is not repeated here.

Step 205, the target page is displayed.

This step may be understood with reference to the detailed description of step 104, and is not repeated here.

Optionally, the update instruction comprises at least a target operation type, and the page update strategy comprises a corresponding relation between the operation type and an address character.

Step 206, in response to an update instruction to the target page, a replacement character in the data interface address is replaced according to a page update strategy corresponding to the target page, and a replaced data interface address is obtained.

According to the embodiments of the present disclosure, the update instruction is an instruction for instructing updating of the content layout in the target page. Page updating processes such as page division and page turning, the data interface address may be updated by adding a special replacement character into the data interface address.

Figure 3:
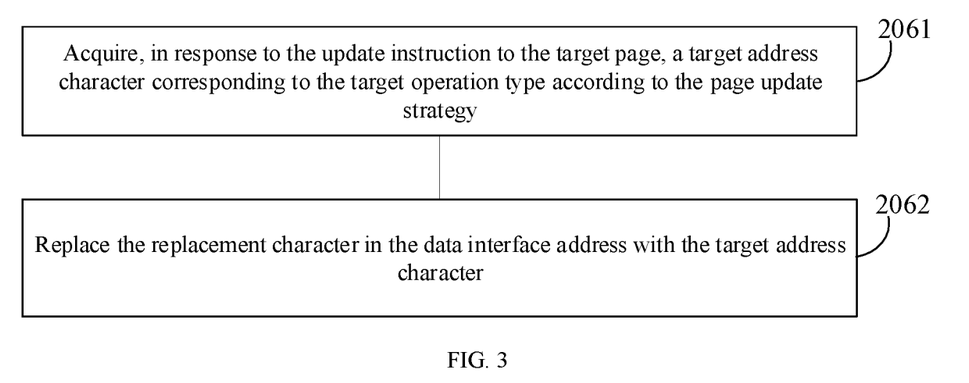
FIG. 3 illustrates a flowchart of a data acquiring method according to the embodiments of the present disclosure.

Optionally, as shown in FIG. 3, step 206 may comprise:

Sub-step 2061, in response to the update instruction to the target page, a target address character corresponding to the target operation type is acquired according to the page update strategy.

According to the embodiments of the present disclosure, the target operation type is used to represent description information of a method for generating the update instruction, for example, a target operation type generated by a user based on input types such as click, long-pressing, sliding, or a target operation type generated by a system which is triggered by a certain means. Based on different operation types, the client of the Flutter application program stores in advance corresponding target address character strings. The page update strategy may be set in the client through an installation package preset in the Flutter application program, or acquired in advance by the client from the server. The specific page update strategy may be set according to actual demands, and is not limited here.

Sub-step 2062, the replacement character in the data interface address is replaced with the target address character.

According to the embodiments of the present disclosure, for example, dat?page=\$page_index is a data interface address before updating, when it needs to upload data in the third page, the bound data interface address is replaced with an address like http://***.com/data?page=3 by replacing the replacement character. Of course, this is merely an exemplary description. The specific operation may be set upon actual demands, and is not limited here.

According to the embodiments of the present disclosure, the data interface address is dynamically updated by configuring the page update strategy for the data interface address in the client of the Flutter application program, and it does not need to acquire the required data interface address from the server each time, thereby enhancing the updating efficiency of page contents.

Step 207, updated data is acquired according to the replaced data interface address.

According to the embodiments of the present disclosure, the replaced data interface address may be used to access the update data of the page contents of the page that need to be updated.

Step 208, the update data and the component data are merged to obtain merged data.

According to the embodiments of the present disclosure, the contents of the target page may be uploaded by merging the update data and the previously acquired component data, so a user may view more page contents through the target page at the same time.

Step 209, a building process of the target page is re-performed according to the update data, and an updated target page is acquired.

According to the embodiments of the present disclosure, the target page containing more page contents may be obtained by re-building the target page using the merged data. The process of re-building the updated target page using the merged data is similar to the page building processes in step 203 and step 204, and therefore is not repeated here.

Step 210, the updated target page is displayed.

According to the embodiments of the present disclosure, the target page is updated by re-building the page with the update data which is acquired based on the replaced data interface address, and it does not need to acquire the component file from the server each time, thereby enhancing the page updating efficiency.

Figure 4:
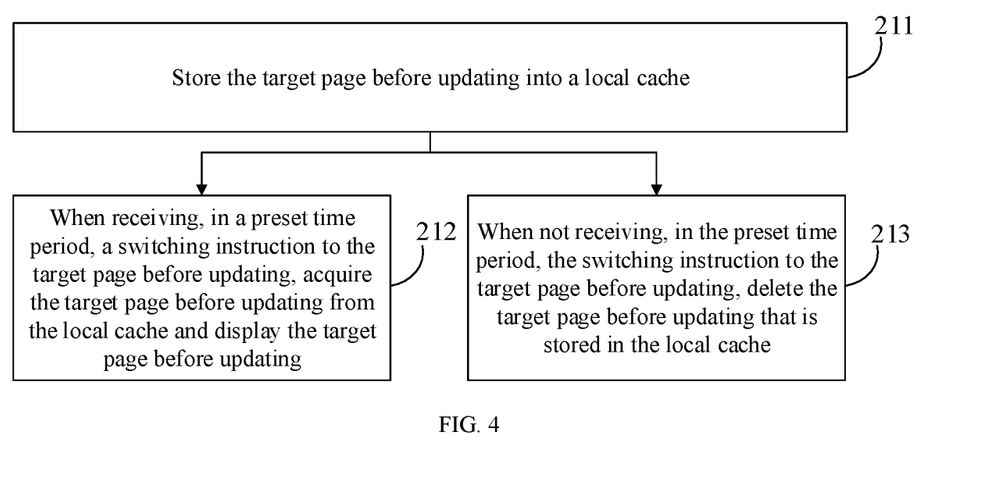
FIG. 4 illustrates a flowchart of a page acquiring method according to the embodiments of the present disclosure.

Optionally, as shown in FIG. 4, after step 210, the method may further comprise:

Step 211, the target page before updating is stored in a local cache.

Step 212, when a switching instruction to the target page before updating is received in a preset time period, the target page before updating is acquired from the local cache and then displayed.

Step 213, when the switching instruction to the target page before updating is not received in the preset time period, the target page before updating that is stored in the local cache is deleted.

According to the embodiments of the present disclosure, data processing resources of a certain device are consumed each time a page is built, and the user may repeatedly view target pages which have been displayed, so after the page is updated, the target page before updating may be stored in the cache of the device for a preset time period. The preset time period may be 20 s, 1 min, 5 min, etc. When the target page before updating needs to be re-displayed, the target page is directly read and displayed from the local cache without re-building, saving the data processing resources required for building the page. Of course, considering limitations to resources stored in the device, the target page before updating that is stored in the local cache may be directly deleted if the target page before updating is not required to be displayed after the preset time period, so as to ensure that the caching process of the target page does not occupy too many data processing resources and that the application program may run properly.

Optionally, when the target page is a list page, the page object comprises list items. Step 204 may comprise: the component data is added into a corresponding list item according to the binding relation to build a list page.

According to the embodiments of the present disclosure, the component object of a whole ListView (page list) is a group of list items. For each of the list items, a serial number of the list item may be added into JsonPath to realize data binding, for example, JsonPath corresponding to the third data may be $['data'][3]['name']. Of course, this is merely an exemplary description. The specific corresponding relation between the list item and the component data may be set upon actual demands, and is not limited here.

Figure 5:
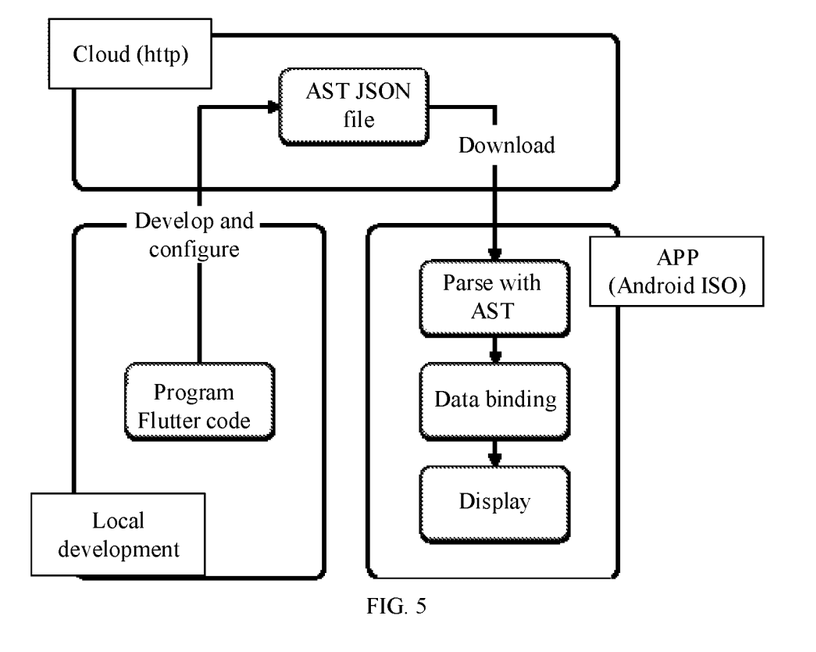
FIG. 5 illustrates a schematic software diagram of a page displaying method according to the embodiments of the present disclosure.

Referring to FIG. 5, in actual application, a developer realizes local development of an application program by programming Flutter codes, and stores the developed application program and component file as JSON files of AST data structure in a cloud server in a network connection, so the user may download and install, using a device, the Flutter application programs from the cloud server, and the client may be based on operating systems such as Android, IOS, etc. When it needs to display a page, the client downloads the component file from the cloud server, parses the component file through AST, and then realizes dynamic acquisition of the page contents according the binding relation in the component file, thereby realizing dynamic updating of the target page in the Flutter application program.

When the Flutter application program needs to display the target page, another page displaying method according to the embodiments of the present disclosure realizes dynamic acquisition of a page layout by acquiring the page file for building the target page from the server to build the target page, and realizes dynamic acquisition of the page contents through the binding relation between the component object and component data in the page, so that the page displayed by the Flutter application program may be updated more efficiently.

Figure 6:
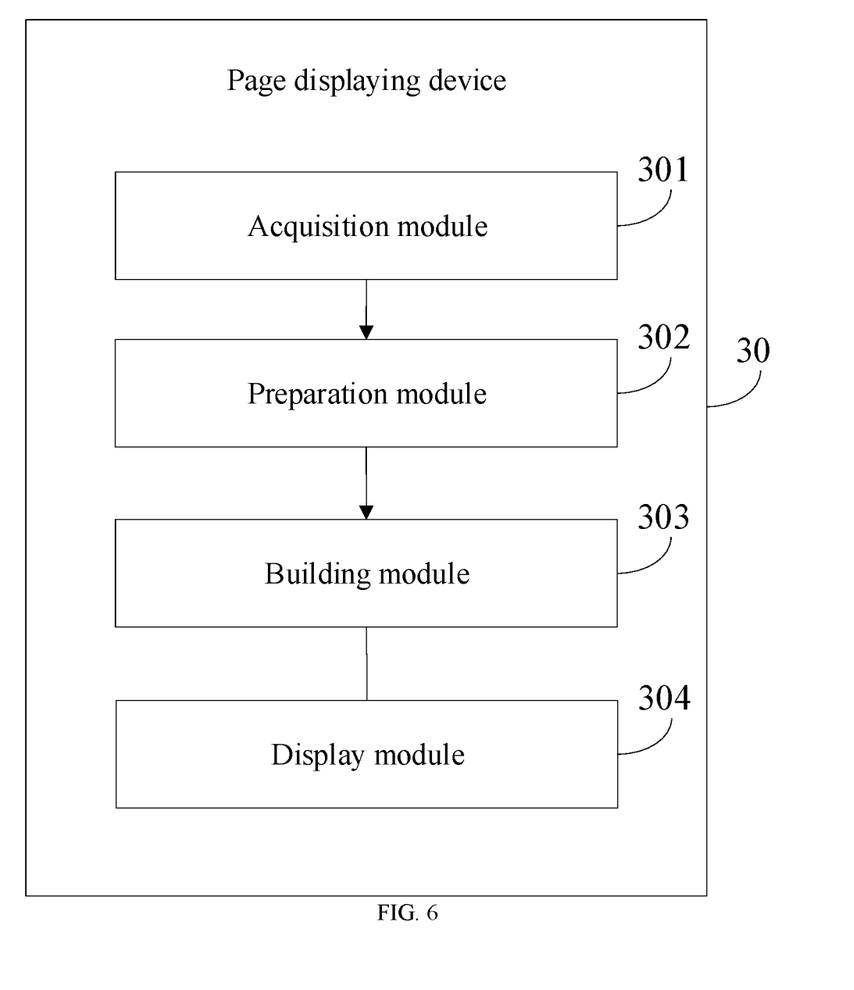
FIG. 6 illustrates a structural block diagram of a page displaying device according to the embodiments of the present disclosure.

FIG. 6 illustrates a structural block diagram of a page displaying device 30 according to the embodiments of the present disclosure. As shown in FIG. 6, the device 30 comprises:

an acquisition module 301, configured to acquire, in response to a display instruction to a target page in a Flutter application program, a component file of the target page from a server, wherein the component file comprises at least: component building information, a data interface address, and a binding relation between component data and a page object;

a preparation module 302, configured to acquire the component data of the target page according to the data interface address, and build a component object of the target page according to the component building information;

a building module 303, configured to merge the component data into a corresponding component object according to the binding relation to build the target page; and a display module 304, configured to display the target page.

Optionally, the device may further comprise an update module, configured to:

replace, in response to an update instruction to the target page, a replacement character in the data interface address according to a page update strategy corresponding to the target page;

acquire update data according to the replaced data interface address;

re-perform a building process of the target page according to the update data, and obtain an updated target page; and display the updated target page.

Optionally, the update instruction comprises at least a target operation type, and the page update strategy comprises a corresponding relation between the operation type and an address character;

Optionally, the update module is further configured to:

acquire, according to the page update strategy, a target address character corresponding to the target operation type; and replace the replacement character in the data interface address with the target address character.

Optionally, the update module is further configured to:

merge the update data with the component data to obtain merged data;

re-perform the building process of the target page according to the merged data, and obtain the updated target page.

The update module is further configured to:

store the target page before updating into a local cache;

when receiving, in a preset time period, a switching instruction to the target page before updating, acquire the target page before updating from the local cache and display the target page before updating;

when not receiving, in a preset time period, a switching instruction to the target page before updating, delete the target page before updating that is stored in the local cache.

Optionally, the acquisition module 301 is further configured to:

acquire a component file of an AST data structure from the server, wherein the component file is obtained by using a language analyzer to convert a DART component file into a JSON component file;

parse the component file according to a parsing rule of the AST data structure, and acquire the component building information, the data interface address, and the binding relation between the component data and the page object of the target page.

Optionally, when the target page is a list page, the page object comprises list items;

The building module 303 is further configured to:

Add the component data into a corresponding list item according to the binding relation to build a list page.

According to the embodiments of the present disclosure, the page displaying device has corresponding functional modules for implementing the page displaying method, and may implement the page displaying method according to any one of embodiments 1-9 while achieving the same beneficial effects.

Figure 7:
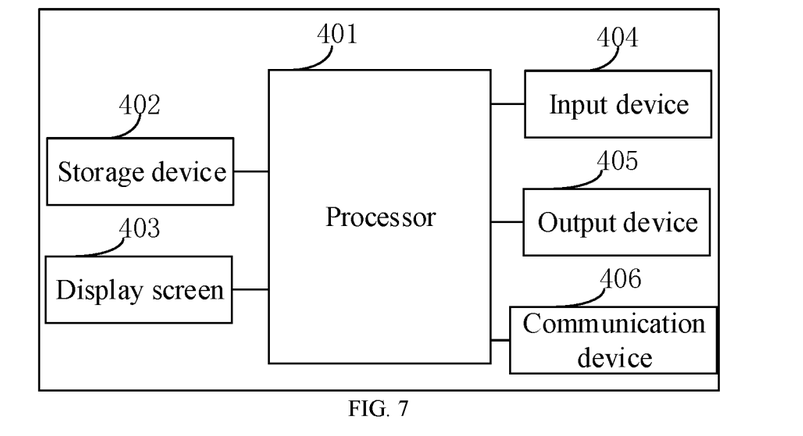
FIG. 7 is a structural diagram of an electronic device according to an embodiment of the present disclosure.

Another embodiment of the present disclosure further provides an electronic device, comprising a processor, a memory and a computer program which is stored in the memory and may be run in the processor, wherein when the computer program is executed by the processor, the steps of the page displaying method according to any one of the above-mentioned embodiments are implemented with the same technical effects, which are not repeated here. Exemplarily, as shown in FIG. 7, the electronic device may specifically comprise a processor 401, a storage device 402, a display screen 403 with a touch function, an input device 404, an output device 405 and a communication device 406. The number of the processor 401 in the electronic device may be one or more. In FIG. 7, one processor 401 is used as an example. The processor 401, the storage device 402, the display screen 403 with a touch function, the input device 404, the output device 405 and the communication device 406 of the electronic device may be connected through buses or by other means.

Another embodiment of the present disclosure further provides a computer-readable storage medium which stores instructions therein, wherein when instructions are run in the computer, the page displaying method according to any one of the above-mentioned embodiments is implemented.

Another embodiment of the present disclosure further provides a computer program product with instructions, wherein when the computer program product is run in the computer, the page displaying method according to any one of the above-mentioned embodiments is implemented.

It should be noted that in this text the relational terms such as "first" and "second" are merely used to distinguish one object or operation from another object or operation, and not necessarily require or hint that those objects or operations have any such actual relationship or are in such actual sequence. Moreover, terms "including", "comprising", or any other variants are used to cover non-exclusive inclusion, so that processes, methods, articles or user equipment, each of which includes a series of factors, include not only those factors but also other unlisted factors, or further include other inherent factors of such processes, methods, articles or user equipment. In the absence of more restrictions, a process, method, article or terminal device comprising an element defined by "one" shall not exclusive of other identical elements.

The embodiments in the present specification are described in a progressive way. For same or similar parts of the embodiments may be understood with reference to the embodiments. Each of the embodiments focuses on a difference from other embodiments. In particular, the system embodiments are similar to method embodiments, and therefore are simply described. Relevant contents may be understood with reference to the method embodiments.

The previous descriptions merely illustrate preferred embodiments of the present disclosure, and are not intended to limit the present specification. Any modifications, equivalent replacement, improvement, etc. made within the spirit and principle of the present disclosure shall fall within the scope of the claims of the present disclosure.

The invention claimed is:

1. A page displaying method, wherein the method comprises:

acquiring, in response to a display instruction to a target page in a Flutter application program, a component file of the target page from a server, wherein the component file comprises at least: component building information, a data interface address, and a binding relation between component data and a page object;

acquiring the component data of the target page according to the data interface address, and building a component object of the target page according to the component building information;

merging the component data into a corresponding component object according to the binding relation, to build the target page; and displaying the target page.

2. The page displaying method according to claim 1, wherein after the step of displaying the target page, the method further comprises:

replacing, in response to an update instruction to the target page, a replacement character in the data interface address according to a page update strategy corresponding to the target page, to obtain a replaced data interface address;

acquiring update data according to the replaced data interface address;

re-performing a building process of the target page according to the update data, to obtain an updated target page; and displaying the updated target page.

3. The page displaying method according to claim 2, wherein the update instruction comprises at least a target operation type, and the page update strategy comprises a corresponding relation between an operation type and an address character;

the step of replacing a replacement character in the data interface address according to a page update strategy corresponding to the target page comprises:

acquiring, according to the page update strategy, a target address character corresponding to the target operation type; and replacing the replacement character in the data interface address with the target address character.

4. The page displaying method according to claim 2, wherein the step of re-performing a building process of the target page according to the updated data, to obtain an updated target page comprises:

merging the update data with the component data to obtain merged data; and re-performing the building process of the target page according to the merged data, to obtain the updated target page.

5. The page displaying method according to claim 2, wherein after the step of displaying the updated target page, the method further comprises storing the target page before updating into a local cache;

when receiving, in a preset time period, a switching instruction to the target page before updating, acquiring the target page before updating from the local cache and displaying the target page before updating; or when not receiving, in the preset time period, the switching instruction to the target page before updating, deleting the target page before updating that is stored in the local cache.

6. The page displaying method according to claim 1, wherein the step of acquiring a component file of the target page from a server comprises:

acquiring a component file of an AST data structure from the server, wherein the component file is obtained by using a language analyzer to convert a DART component file into a JSON component file; and parsing the component file according to a parsing rule of the AST data structure, and acquiring the component building information, the data interface address, and the binding relation between the component data and the page object of the target page.

7. The page displaying method according to claim 1, wherein when the target page is a list page, the page object comprises list items;

the step of merging the component data into a corresponding component object according to the binding relation to build the target page comprises:

adding the component data into a corresponding list item according to the binding relation to build a list page.

8. A nonvolatile computer-readable storage media, having a computer program stored therein, wherein when the computer program is executed by a processor, implements operations comprising:

acquiring, in response to a display instruction to a target page in a Flutter application program, a component file of the target page from a server, wherein the component file comprises at least: component building information, a data interface address, and a binding relation between component data and a page object;

acquiring the component data of the target page according to the data interface address, and building a component object of the target page according to the component building information;

merging the component data into a corresponding component object according to the binding relation, to build the target page; and displaying the target page.

9. The storage media according to claim 8, wherein after the operation of displaying the target page, the operation further comprises:

replacing, in response to an update instruction to the target page, a replacement character in the data interface address according to a page update strategy corresponding to the target page, to obtain a replaced data interface address;

acquiring update data according to the replaced data interface address;

re-performing a building process of the target page according to the update data, to obtain an updated target page; and displaying the updated target page.

10. The storage media according to claim 9, wherein the update instruction comprises at least a target operation type, and the page update strategy comprises a corresponding relation between an operation type and an address character;

the operation of replacing a replacement character in the data interface address according to a page update strategy corresponding to the target page comprises:

acquiring, according to the page update strategy, a target address character corresponding to the target operation type; and replacing the replacement character in the data interface address with the target address character.

11. The storage media according to claim 9, wherein the operation of re-performing a building process of the target page according to the updated data, to obtain an updated target page comprises:

merging the update data with the component data to obtain merged data; and re-performing the building process of the target page according to the merged data, to obtain the updated target page.

12. The storage media according to claim 9, wherein after the operation of displaying the updated target page, the operation further comprises storing the target page before updating into a local cache;

when receiving, in a preset time period, a switching instruction to the target page before updating, acquiring the target page before updating from the local cache to display; or when not receiving, in the preset time period, the switching instruction to the target page before updating, deleting the target page before updating that is stored in the local cache.

13. The storage media according to claim 8, wherein the operation of acquiring a component file of the target page from a server comprises:

acquiring a component file of an AST data structure from the server, wherein the component file is obtained by using a language analyzer to convert a DART component file into a JSON component file; and parsing the component file according to a parsing rule of the AST data structure, and acquiring the component building information, the data interface address, and the binding relation between the component data and the page object of the target page.

14. The storage media according to claim 8, wherein when the target page is a list page, the page object comprises list items;

the operation of merging the component data into a corresponding component object according to the binding relation to build the target page comprises:

adding the component data into a corresponding list item according to the binding relation to build a list page.

15. An electronic device, wherein the electronic device comprises:

a processor, a memory, and a computer program which is stored in the memory and is capable of being run in the processor, wherein when the computer program is executed by the processor, implements operations comprising:

acquiring, in response to a display instruction to a target page in a Flutter application program, a component file of the target page from a server, wherein the component file comprises at least: component building information, a data interface address, and a binding relation between component data and a page object;

acquiring the component data of the target page according to the data interface address, and building a component object of the target page according to the component building information;

merging the component data into a corresponding component object according to the binding relation, to build the target page; and displaying the target page.

16. The electronic device according to claim 15, wherein after the operation of displaying the target page, the operation further comprises:

replacing, in response to an update instruction to the target page, a replacement character in the data interface address according to a page update strategy corresponding to the target page, to obtain a replaced data interface address;

acquiring update data according to the replaced data interface address;

re-performing a building process of the target page according to the update data, to obtain an updated target page; and displaying the updated target page.

17. The electronic device according to claim 16, wherein the update instruction comprises at least a target operation type, and the page update strategy comprises a corresponding relation between an operation type and an address character;

the operation of replacing a replacement character in the data interface address according to a page update strategy corresponding to the target page comprises:

acquiring, according to the page update strategy, a target address character corresponding to the target operation type; and replacing the replacement character in the data interface address with the target address character.

18. The electronic device according to claim 16, wherein the operation of re-performing a building process of the target page according to the updated data, to obtain an updated target page comprises:

merging the update data with the component data to obtain merged data; and re-performing the building process of the target page according to the merged data, to obtain the updated target page.

19. The electronic device according to claim 16, wherein after the operation of displaying the updated target page, the operation further comprises storing the target page before updating into a local cache;

when receiving, in a preset time period, a switching instruction to the target page before updating, acquiring the target page before updating from the local cache to display; or when not receiving, in the preset time period, the switching instruction to the target page before updating, deleting the target page before updating that is stored in the local cache.

20. The electronic device according to claim 15, wherein the operation of acquiring a component file of the target page from a server comprises:

acquiring a component file of an AST data structure from the server, wherein the component file is obtained by using a language analyzer to convert a DART component file into a JSON component file; and parsing the component file according to a parsing rule of the AST data structure, and acquiring the component building information, the data interface address, and the binding relation between the component data and the page object of the target page.

* * * * *